United States Patent
Liu et al.

(10) Patent No.: US 9,112,226 B2
(45) Date of Patent: Aug. 18, 2015

(54) ANODE MATERIAL FOR ULTRAFAST-CHARGING LITHIUM ION BATTERIES AND A METHOD OF ITS SYNTHESIS

(71) Applicant: Nanyang Technological University, Singapore (SG)

(72) Inventors: Xuewei Liu, Singapore (CN); Jiehua Liu, Singapore (CN)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 14/376,092

(22) PCT Filed: Jan. 31, 2013

(86) PCT No.: PCT/SG2013/000040
§ 371 (c)(1),
(2) Date: Jul. 31, 2014

(87) PCT Pub. No.: WO2013/115727
PCT Pub. Date: Aug. 8, 2013

(65) Prior Publication Data
US 2015/0014582 A1    Jan. 15, 2015

Related U.S. Application Data

(60) Provisional application No. 61/593,600, filed on Feb. 1, 2012.

(51) Int. Cl.
*H01M 4/485* (2010.01)
*H01M 4/04* (2006.01)
(Continued)

(52) U.S. Cl.
CPC .............. *H01M 4/485* (2013.01); *C01G 23/005* (2013.01); *H01M 4/0471* (2013.01);
(Continued)

(58) Field of Classification Search
None
See application file for complete search history.

(56) References Cited

U.S. PATENT DOCUMENTS

2007/0148545 A1* 6/2007 Amine et al. .............. 429/231.1
2009/0162750 A1* 6/2009 Kawakami et al. ........ 429/218.1
(Continued)

FOREIGN PATENT DOCUMENTS

WO    2013115727 A8    8/2013

OTHER PUBLICATIONS

Foreign Communication from a Related Counterpart Application, International Search Report and Written Opinion dated Apr. 24, 2013, International Application No. PCT/SG13/00040 filed on Jan. 31, 2013.
(Continued)

*Primary Examiner* — Joseph D Anthony

(57) ABSTRACT

An anode material for ultrafast-charging lithium ion batteries, the anode material comprising $C—Li_4Ti_5O_{12}$. A method of synthesizing an anode material for ultrafast-charging lithium ion batteries, the method comprising the steps of: adding lithium to an organic alcohol to form a first solution; adding titanium via an organic titanium source to the first solution to form a second solution; adding water to the second solution to form a diluted second solution; heating the diluted second solution at a temperature ranging from about 80° C. to about 180° C. to obtain solid $Li_4Ti_5O_{12}$; and annealing the solid $Li_4Ti_5O_{12}$ in the absence of air to obtain the anode material comprising $C—Li_4Ti_5O_{12}$.

12 Claims, 13 Drawing Sheets

(51) Int. Cl.
H01M 4/36 (2006.01)
H01M 4/131 (2010.01)
H01M 4/1391 (2010.01)
C01G 23/00 (2006.01)

(52) U.S. Cl.
CPC ........... *H01M 4/131* (2013.01); *H01M 4/1391* (2013.01); *H01M 4/362* (2013.01); *H01M 4/366* (2013.01); *C01P 2002/72* (2013.01); *C01P 2002/85* (2013.01); *C01P 2004/04* (2013.01); *C01P 2004/24* (2013.01); *C01P 2006/12* (2013.01); *C01P 2006/16* (2013.01); *C01P 2006/17* (2013.01); *C01P 2006/80* (2013.01); *H01M 2220/20* (2013.01); *Y02E 60/122* (2013.01)

(56) References Cited

U.S. PATENT DOCUMENTS

| | | | |
|---|---|---|---|
| 2009/0305132 | A1* | 12/2009 | Gauthier et al. ............ 429/207 |
| 2011/0000698 | A1* | 1/2011 | Osada et al. ............ 174/137 B |
| 2011/0189544 | A1 | 8/2011 | Kim et al. |
| 2011/0210293 | A1* | 9/2011 | Liang et al. ............ 252/506 |
| 2013/0079520 | A1* | 3/2013 | Liu et al. ............ 546/2 |
| 2014/0127581 | A1 | 5/2014 | Chen |

OTHER PUBLICATIONS

Foreign Communication from a Related Counterpart Application, International Preliminary Report on Patentability dated Dec. 16, 2013, International Application No. PCT/SG13/00040 filed on Jan. 31, 2013.
Yang, Liuxiang, et al., Li4Ti5O12/C Composite Electrode Material Synthesized Involving Conductive Carbon Precursor for Li-Ion Batteries:, Journal of Alloys an Compounds 485 (2009) 93-97, Available online Jun. 6, 2009.
Zhao, Liang, et al., "Porous Li4Ti5O12 Coated with N-Doped Carbon from Ionic Liquids for Li-Ion Batteries", Advanced Materials 2001, 23, 1385-1388.
Zhu, Guan-Nan, et al., "Carbon-Coated Nano-Sized Li4Ti5O12 Nanoporous Micro-Sphere as Anode Material for High-Rate Lithuim-Ion Batteries", Energy Environmental Science, 2011, 4, 4016-4022.
Chan, C. K.; Peng, H. L.; Liu, G.; McIlwrath, K.; Zhang, X. F.; Huggins, R. A.; Cui, Y. Nat. Nanotechnol. 2008, 3, 31.
Paek, S. M.; Yoo, E.; Honma, I. Nano Lett. 2009, 9, 72.
Zhang, W. M.; Hu, J. S.; Guo, Y. G.; Zheng, S. F.; Zhong, L. S.; Song, W. G.; Wan, L. J. Adv. Mater. 2008, 20, 1160.
Lou, X. W.; Deng, D.; Lee, J. Y.; Feng, J.; Archer, L. A. Adv. Mater. 2008, 20, 258.
Magasinski, A.; Dixon, P.; Hertzberg, B.; Kvit, A.; Ayala, J.; Yushin, G. Nat. Mater. 2010, 9, 353.
Kang, B.; Ceder, G. Nature 2009, 458, 190.
Kang, K. S.; Meng, Y. S.; Breger, J.; Grey, C. P.; Ceder, G. Science 2006, 311, 977.
Nam, K. T.; Kim, D. W.; Yoo, P. J.; Chiang, C. Y.; Meethong, N.; Hammond, P. T.; Chiang, Y. M.; Belcher, A. M. Science 2006, 312, 885.
Ohzuku, T.; Ueda, A.; Yamamoto, N. J. Electrochem. Soc. 1995, 142, 1431.
Kavan, L.; Gratzel, M. Electrochem. Solid State Lett. 2002, 5, A39.

Huang, S. H.; Wen, Z. Y.; Zhu, X. J.; Gu, Z. H. Electrochem. Commun. 2004, 6, 1093.
Park, K. S.; Benayad, A.; Kang, D. J.; Doo, S. G. J. Am. Chem. Soc. 2008, 130, 14930.
Li, X.; Qu, M. Z.; Huai, Y. J.; Yu, Z. L. Electrochim. Acta 2010, 55, 2978.
Yi, T.-F.; Jiang, L.-J.; Shu, J.; Yue, C.-B.; Zhu, R.-S.; Qiao, H.-B. J. Phys. Chem. Solids 2010, 71, 1236.
S. H. Huang, Z. Y. Wen, X. J. Zhu, Z. H. Gu, Electrochem. Commun. 2004, 6, 1093-1097.
K. S. Park, A. Benayad, D. J. Kang, S. G. Doo, J. Am. Chem. Soc. 2008, 130, 14930-14931.
X. Li, M. Z. Qu, Y. J. Huai, Z. L. Yu, Electrochim. Acta 2010, 55, 2978-2982.
T.-F. Yi, L.-J. Jiang, J. Shu, C.-B. Yue, R.-S. Zhu, H.-B. Qiao, J. Phys. Chem. Solids 2010, 71, 1236-1242.
L. Cheng, H. J. Liu, J. J. Zhang, H. M. Xiong, Y. Y. Xia, J. Electrochem. Soc. 2006, 153, A1472-A1477.
M. M. Rahman, J. Z. Wang, M. F. Hassan, S. L. Chou, D. Wexler, H. K. Liu, J. Power Sources 2010, 195, 4297-4303.
S. H. Yu, A. Pucci, T. Herntrich, M. G. Willinger, S. H. Baek, Y. E. Sung, N. Pinna, J. Mater. Chem. 2011, 21, 806-810.
J. Lim, E. Choi, V. Mathew, D. Kim, D. Ahn, J. Gim, S. H. Kang, J. Kim, J. Electrochem. Soc. 2011, 158, A275-A280.
L. Kavan, J. Prochazka, T. M. Spitler, M. Kalbac, M. T. Zukalova, T. Drezen, M. Gratzel, J. Electrochem. Soc. 2003, 150, A1000-A1007.
J. R. Li, Z. L. Tang, Z. T. Zhang, Electrochem. Commun. 2005, 7, 894-899.
C. Lai, Y. Y. Dou, X. Li, X. P. Gao, J. Power Sources 2010, 195, 3676-3679.
J. J. Huang, Z. Y. Jiang, Electrochim. Acta 2008, 53, 7756-7759.
Y. F. Tang, L. Yang, S. H. Fang, Z. Qiu, Electrochim. Acta 2009, 54, 6244-6249.
J. Liu, J. S. Chen, X. Wei, X. W. Lou, X.-W. Liu, Adv. Mater. 2011, 23, 998-1002.
C. P. Grey, N. Dupre, Chem. Rev. 2004, 104, 4493-4512.
M. Wagemaker, R. van de Krol, A. P. M. Kentgens, A. A. van Well, F. M. Mulder, J. Am. Chem. Soc. 2001, 123, 11454-11461.
W. J. H. Borghols, D. Lutzenkirchen-Hecht, U. Haake, W. Chan, U. Lafont, E. M. Kelder, E. R. H. van Eck, A. P. M. Kentgens, F. M. Mulder, M. Wagemaker, J. Electrochem. Soc. 2010, 157, A582-A588.
H.-G Jung, S.-T. Myung, C. S. Yoon, S.-B. Son, K. H. Oh, K. Amine, B. Scrosati, Y.-K. Sun, Energy Environ. Sci. 2011, 4, 1345-1351.
H. Zhang, G. R. Li, L. P. An, T. Y. Yan, X. P. Gao, H. Y. Zhu, J. Phys. Chem. C 2007, 111, 6143-6148.
S. Scharner, W. Weppner, P. Schmid-Beurmann, J. Electrochem. Soc. 1999, 146, 857-861.
K. Amine, I. Belharouak, Z. H. Chen, T. Tran, H. Yumoto, N. Ota, S. T. Myung, Y. K. Sun, Adv. Mater. 2010, 22, 3052-3057.
L. Zhao, Y.-S. Hu, H. Li, Z. Wang, L. Chen, Adv. Mater. 2011, 23, 1385-1388.
G.-N. Zhu, H.-J. Liu, J.-H. Zhuang, C.-X. Wang, Y.-G. Wang, Y.-Y. Xia, Energy Environ. Sci. 2011, 4, 4016-4022.
Coleman, J. N.; Lotya, M.; O'Neill, A.; Bergin, S. D.; King, P. J.; Khan, U.; Young, K.; Gaucher, A. et al. (2011). "Two-Dimensional Nanosheets Produced by Liquid Exfoliation of Layered Materials". Science 331 (6017): 568-571. doi:10.1126/science.1194975. PMID 21292974.
Guo, Shaojun; Dong, Shaojun (2011). "Graphene nanosheet: synthesis, molecular engineering, thin film, hybrids, and energy and analytical applications". Chemical Society Reviews 40 (5): 2644-2672. doi: 10.1039/C0CS00079E. PMID 21283849.

\* cited by examiner

ANODE MATERIAL FOR ULTRAFAST-CHARGING LITHIUM ION BATTERIES AND A METHOD OF ITS SYNTHESIS

CROSS-REFERENCE TO RELATED APPLICATIONS

This application is a filing under 35 U.S.C. 371 as the National Stage of International Application No. PCT/SG2013/000040, filed Jan. 31, 2013, entitled "AN ANODE MATERIAL FOR ULTRAFAST-CHARGING LITHIUM ION BATTERIES AND A METHOD OF ITS SYNTHESIS", which claims the benefit of and priority to U.S. Application No. 61/593,600, filed Feb. 1, 2012, both of which are incorporated herein by reference in their entirety for all purposes.

TECHNICAL FIELD

This invention relates to an anode material for ultrafast-charging lithium ion batteries and a method of its synthesis.

BACKGROUND

Ultrafast charging lithium-ion batteries have huge potential market size on demand due to their shortened charging time which can be as quickly as refueling for gas-powered vehicles. However, high-rate recharge produces sudden heating, which gives rise to a fire hazard for high-power batteries with high-cost metallic lithium anode as well as new high-capacity anode materials, such as micro/nano silicon[1], $SnO_2$[2,3], or $Co_3O_4$[4]. Compared with the progress of the high-performance cathode materials[5-8], there is an urgent task to develop high-performance anode materials for safe high-power lithium ion batteries. Spinel $Li_4Ti_5O_{12}$ (LTO) is an ideal host owing not only to its 'zero-strain insertion' structural characteristics, but also to its low cost, abundance and environmental benignity.[9] However, the inherent insulating characteristic of LTO seriously limits its high-rate capability, which is a key parameter to obtaining high-power density in batteries.[10]

In principle, the charging-rate capability of safe lithium ion batteries depends largely on the performance of anode for lithium storage. Although the addition of conductive additives could improve its surface electronic conductivity for achieving high rate capability[15], the cost of LTO materials is increased due to complicated procedures and some expensive additives. On the other hand, LTO materials obtained by molten-salt method often need to undergo long-time and high-strength milling.[16] The low surface area of sintered grains is also a crucial factor that hampers the improvement of rate performance and available capacities for LTO electrodes. Therefore, there still remains a challenging issue in developing novel structured LTO materials as suitable anodes for ultra-fast charging lithium ion batteries.

To solve the above problems, nanostructured electrode materials with a larger surface area and short path for lithium-ion migration were exploited for increasing the active material/electrolyte interface and shortening the time of Li-ion insertion/extraction. It has been demonstrated that nanostructured LTO materials, such as nanocrystals,[17] nanowires,[18] hierarchical structure[19] as well as their composite with conductive additives,[20] could help to fulfill such purpose and also facilitate the electrochemical insertion/extraction of lithium ions. However, although the addition of conductive additives could improve the high rate capability of LTO[15-18], the cost of LTO materials is increased due to complicated procedures and some expensive additives.

Furthermore, although ultrathin nanosheets are a desired framework for lithium storage owing to large exposed area and short path for Li ion transfer, smooth facets of the nanosheets are easily bonded when overlapping with each other at high temperatures, which leads to a decrease of surface area and affect the battery's performance. Although assembling the nanosheets into the hierarchical structure is an efficient way to increase their surface area, the high porosity of the electrode makes the power density low and the reported surface area of LTO or $TiO_2$ nanosheets is no more than 140 $m^2 g^{-1}$.[21]

SUMMARY

The anode materials with open channels and efficiently exposed facets have a direct influence on the battery's capacity and recyclability. Therefore, the corrugated 2D structure proposed in this project may retain big exposed surface area and improve its capacity. Improvement of surface performance may be achieved with the aid of sample and low-cost structure directing agents.

The present invention provides a facile and sustainable 'co-hydrolysis' route for low-cost and large-scale synthesis of novel wavelike spinel LTO nanosheets with 'carbon joint' and a promising surface properties, which successfully conquers the insulating characteristic of LTO. In this work, the corrugated spinel single-crystal $Li_4Ti_5O_{12}$ nanosheets with high surface area were successfully synthesized using the shortest bifunctional structure-inducing agent. The material has an attractive architecture for the Li-ion battery electrode. Its capacity has a distinct increase owing to the pseudocapacitive effect. As a result, the 2D wavelike LTO with 0.6 wt. % 'carbon joint' exhibits excellent capacities of lithium storage at high discharge/charge rates of 10 C-100 C (1.7-17 A $g^{-1}$) and its full discharging/charging time can be shortened to 1 minute or less. This novel anode material makes it possible to develop safe 'one-minute charging' lithium ion batteries and will significantly push forward progress of batteries for fast energy storage.

According to a first aspect, there is provided an anode material for ultrafast-charging lithium ion batteries, the anode material comprising C—$Li_4Ti_5O_{12}$.

The anode material may comprise 0.6 wt. % carbon.

The anode material may have a lithium storage capacity of 180-122 mA h $g^{-1}$.

The anode material may have a discharge/charge rate ranging from 1.7 to 17 A $g^{-1}$.

The anode material may have a full discharging/charging time of less than or equal to one minute at a discharging/charging rate of 50 C.

The C—$Li_4Ti_5O_{12}$ may comprise two-dimensional wavy $Li_4Ti_5O_{12}$ nanosheets having carbon joints at adjacent $Li_4Ti_5O_{12}$ interfaces between adjacent two-dimensional wavy $Li_4Ti_5O_{12}$ nanosheets.

The carbon joints at adjacent $Li_4Ti_5O_{12}$ interfaces may be alternated with open channels formed between adjacent two-dimensional wavy $Li_4Ti_5O_{12}$ nanosheets.

According to a second aspect, there is provided a method of synthesizing an anode material for ultrafast-charging lithium ion batteries, the method comprising the steps of: adding lithium to an organic alcohol to form a first solution; adding titanium via an organic titanium source to the first solution to form a second solution; adding water to the second solution to form a diluted second solution; heating the diluted second solution at a temperature ranging from about 80° C. to about 180° C. to obtain solid $Li_4Ti_5O_{12}$; and annealing the solid $Li_4Ti_5O_{12}$ in the absence of air to obtain the anode material comprising $C-Li_4Ti_5O_{12}$.

The annealing may form carbon joints at adjacent $Li_4Ti_5O_{12}$ interfaces between adjacent two-dimensional wavy $Li_4Ti_5O_{12}$ nanosheets.

The carbon joints may be alternated with open channels formed between adjacent two-dimensional wavy $Li_4Ti_5O_{12}$ nanosheets.

The organic alcohol may be dimethylethanolamine (DMEA).

The annealing may comprise carbonizing a single-molecule layer of the DMEA.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings.

DETAILED DESCRIPTION OF EXEMPLARY EMBODIMENTS

An exemplary anode material 10 and a method 100 of its synthesis will be described with reference to FIGS. 1 to 17 below.

Figure 1:
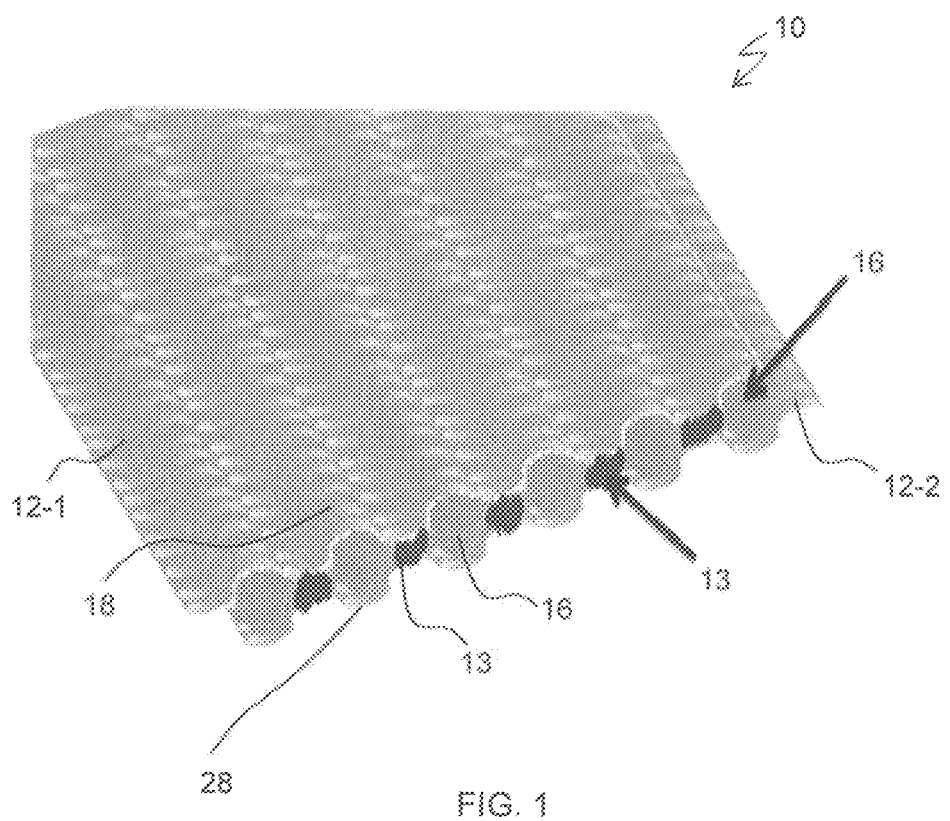
FIG. 1 is a schematic illustration of an anode material of the present invention showing formation of a 'carbon joint' between overlapped wavelike or wavy LTO nanosheets.
Figure 2:
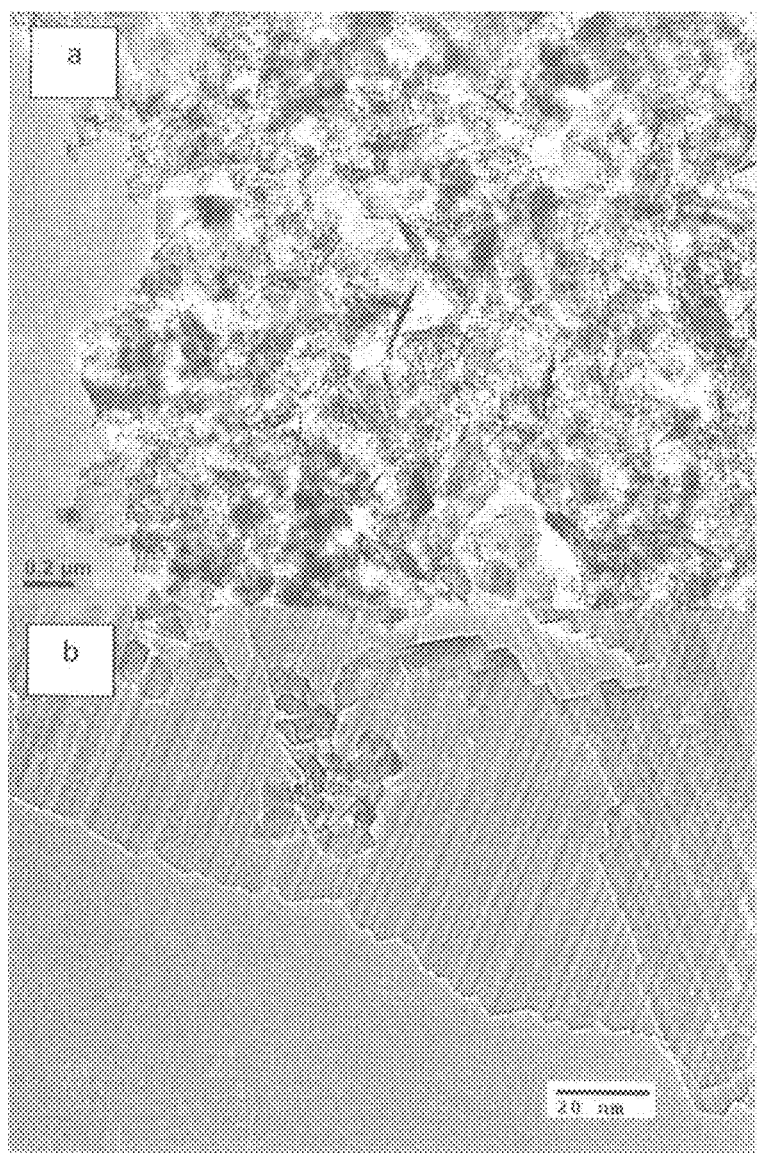
FIGS. 2a and 2b are TEM images of wavelike $Li_4Ti_5O_{12}$ nanosheets annealed at 773K.
Figure 3:
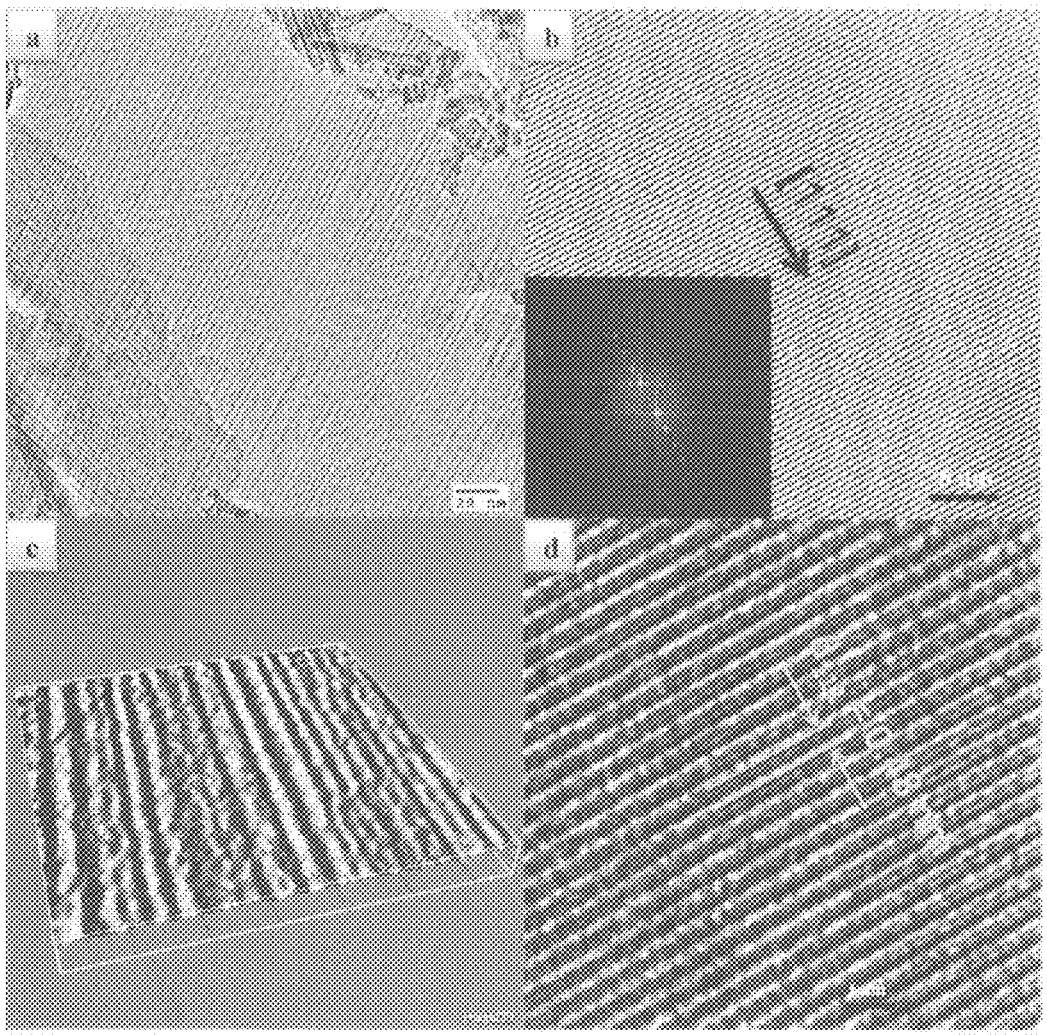
FIG. 3a is a TEM image of wavelike $Li_4Ti_5O_{12}$ nanosheet annealed at 500° C.
FIG. 3b is an HRTEM image of the nanosheet of FIG. 3a and an inset of its fast Fourier transform pattern.
FIG. 3c is a three dimensional (3D) image of the image of FIG. 3b.
FIG. 3d is a magnified lattice fringe of the image of FIG. 3b.

As shown in FIG. 1, the anode material 10 comprises $C-Li_4Ti_5O_{12}$. In a preferred embodiment, the $C-Li_4Ti_5O_{12}$ comprises two-dimensional wavy $Li_4Ti_5O_{12}$ nanosheets 12 having carbon joints 14 at adjacent $Li_4Ti_5O_{12}$ interfaces. The carbon joints 14 may be alternated with open channels 16 formed between adjacent two-dimensional wavy $Li_4Ti_5O_{12}$ nanosheets. Each open channel 16 may arise due to a crest 18 in a wave of a first wavy $Li_4Ti_5O_{12}$ nanosheet 12-1 coinciding and aligning with a trough 28 in a wave of a second wavy $Li_4Ti_5O_{12}$ nanosheet 12-2.

Electron Microscopy Analysis

Figure 4:
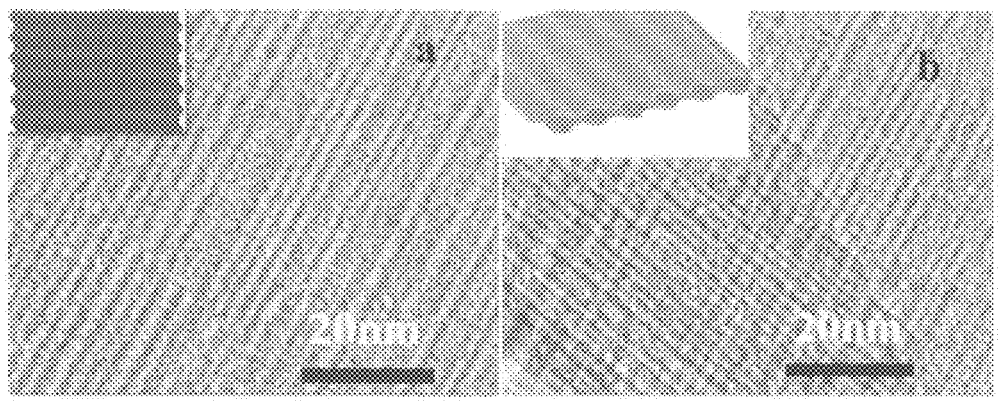
FIGS. 4a and 4b are TEM images with schematic insets of single-layer and overlapped LTO nanosheets respectively.
Figure 11:
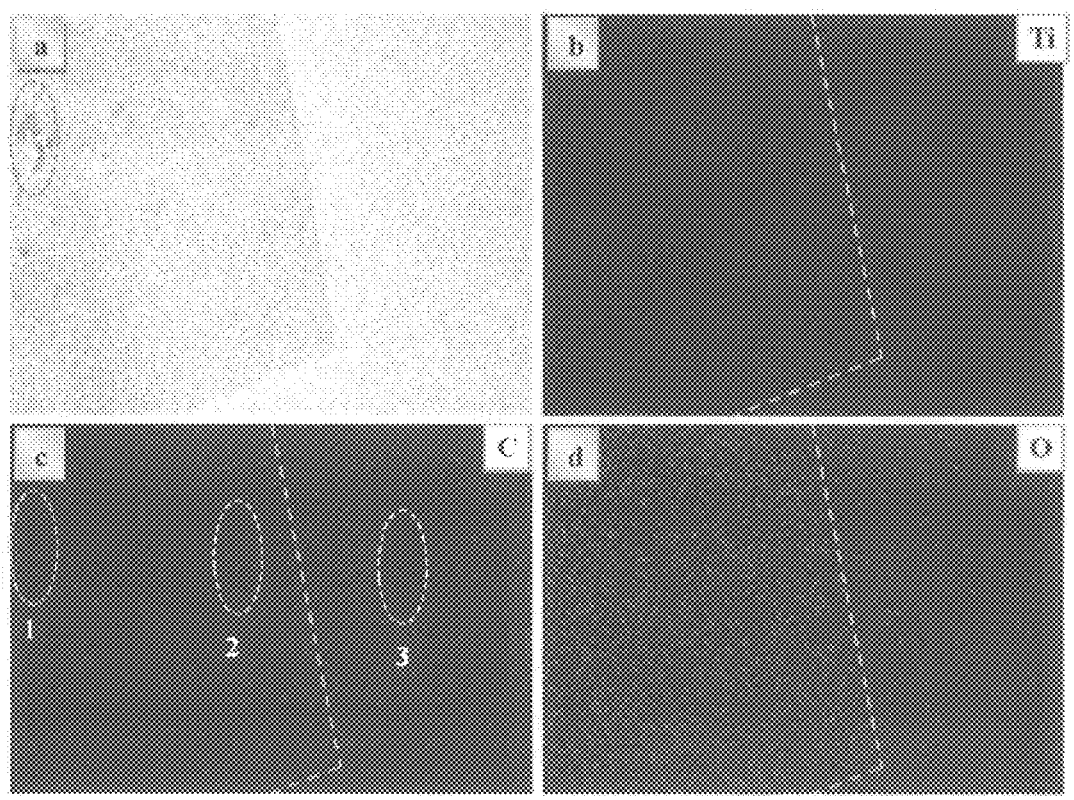
FIG. 11a is an STEM image of single wavelike LTO nanosheet.
FIGS. 11b, 11c and 11d are EDS elemental maps of Ti, C and O respectively.

The morphology of the two-dimensional wavy $Li_4Ti_5O_{12}$ nanosheet can be observed directly with the help of a transmission electron microscope (TEM). FIG. 2a clearly shows that annealed LTO sample is nanosheet-like structure with a rough surface. Some smaller nanocrystals take the role of pillars to avoid overlap to some extent at high temperature. The wavelike framework with non-periodic corrugation could be also seen, as shown in FIGS. 2a and 2b. In the high-magnification TEM image (FIG. 3b), it can be observed that one set of big-area lattices are present. Its fast Fourier transform pattern (the inset of FIG. 3b) indicates single-crystal framework corresponding to LTO planes zone. The wavelike framework is also supported by a 3D image (FIG. 3c) of LTO nanosheet obtained by Image J software analysis. The lattice on the exposed facet displays an equal interfringe spacing of 0.48 nm along the axis (FIG. 3d), which offers enough space for zero-strain insertion of lithium ions with a diameter of 0.12 nm. The overlapped nanosheets can still retain their exposed surface owing to the unique wavelike structure, which can be directly observed in overlapped LTO nanosheets as shown in FIG. 4.

XRD Patterns Analysis

Figure 5A:
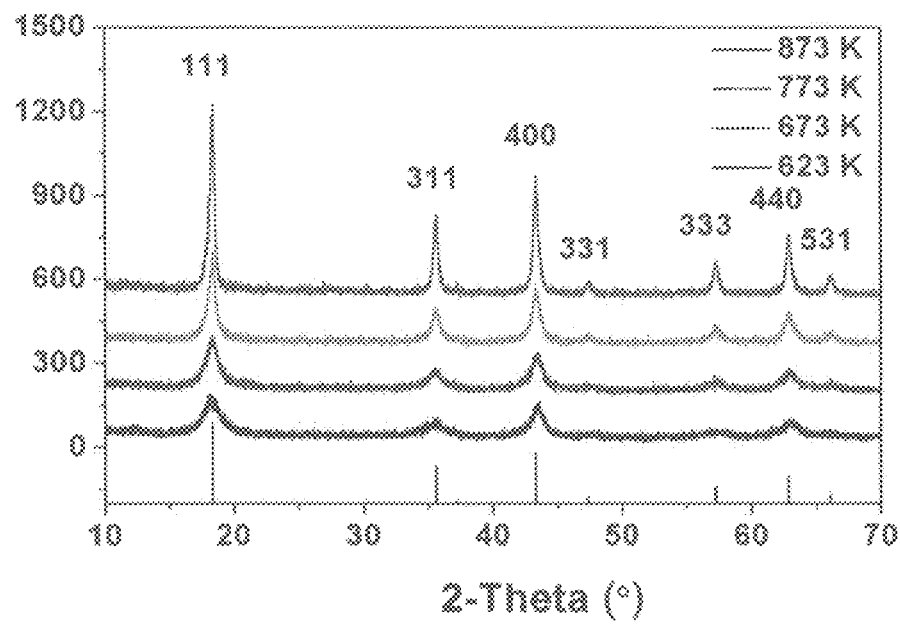
FIG. 5a is a graph showing X-ray diffraction (XRD) patterns of LTO samples annealed at 623K, 673K, 773K, and 873K.
Figure 5B:
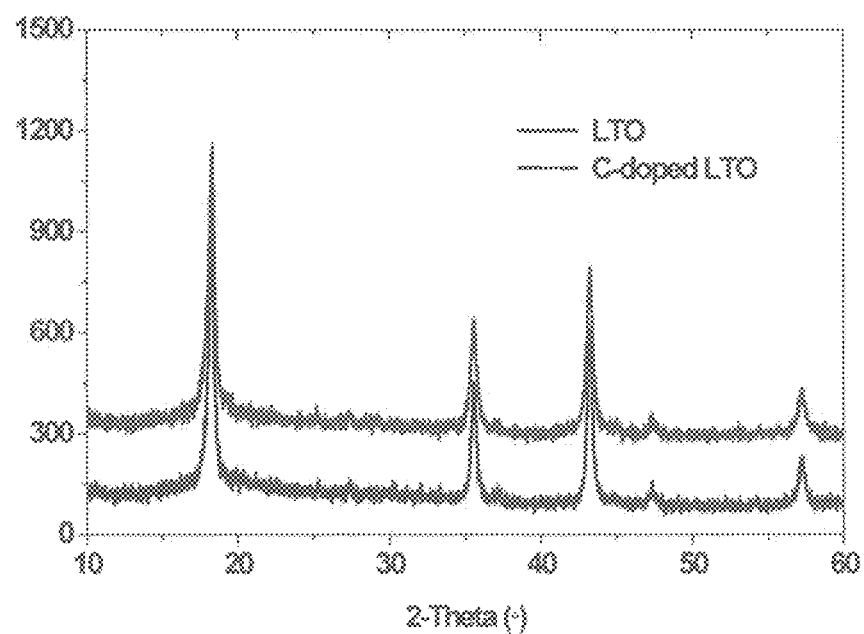
FIG. 5b is a graph showing X-ray diffraction (XRD) patterns of an LTO sample and a CLTO sample annealed at 873K.

The X-ray diffraction (XRD) patterns were obtained for the LTO samples annealed at 623, 673, 773 and 873 K, as shown in FIG. 5a All Bragg peaks are consistent with those of spinel $Li_4Ti_5O_{12}$ phase (space group Fd/3m (227); JCPDS no. 049-0207). The crystal size increases while increasing temperature based on full width at half maximum of peak (111). There were no significant differences concerning the XRD pattern between LTO and CLTO at high crystallization temperature of 873 K (FIG. 5b). The crystal size is ~10 nm after calcination at 500° C. (LTO-500), which is used for subsequence analysis.

Surface Properties Analysis

Figure 6A:
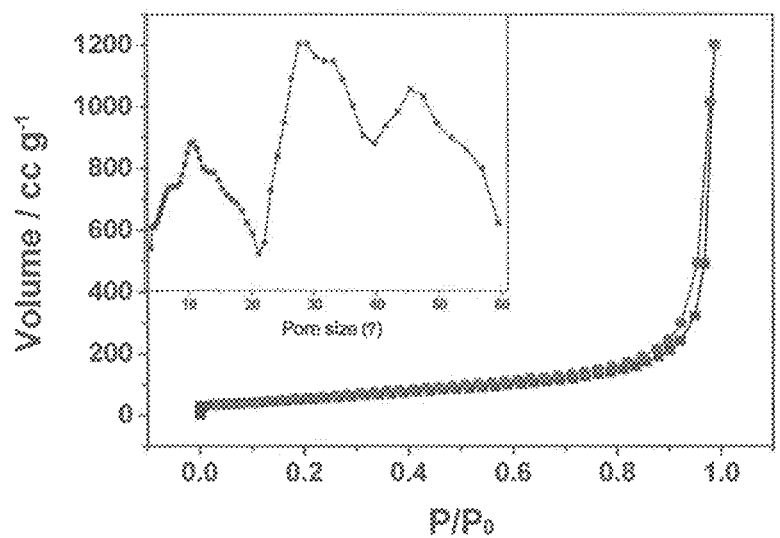
FIG. 6a is a graph showing $N_2$ adsorption-desorption isotherms of an LTO sample annealed at 773 K and the inset shows its pore size distribution.
Figure 6B:
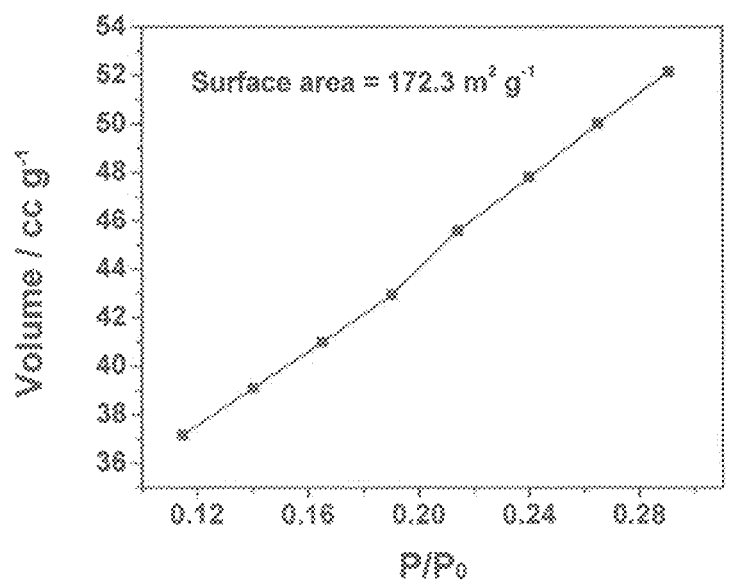
FIG. 6b is a graph showing $N_2$ adsorption isotherms of an LTO sample annealed at 873 K using measurement of multipoint BET.

Surface properties of LTO were also detected via $N_2$ adsorption-desorption method. Its $N_2$ adsorption-desorption isotherms and pore size distribution were measured for LTO sample LTO-500 (FIG. 6). $N_2$ adsorption isotherm is similar with the type III of IUPAC classifications, which describes adsorption on the adsorbent with $N_2$-adsorbent interaction with the absorbed $N_2$ volume of 1200 $cm^3$ $g^{-1}$. The surface area and total pore volume of LTO-500 nanosheets are 206 $m^2$ $g^{-1}$ and 0.166 $cm^3$ $g^{-1}$ respectively, which were obtained from $N_2$ adsorption-desorption isotherm at 77 K using the DFT (density functional theory) method (FIG. 6a). To our best knowledge, this surface area is the largest among all reported results of LTO nanosheets annealed at 773 K. From the pore size distribution curve of LTO, three peaks are present at 1.1, 2.9, 4.6 nm respectively, which are corresponding to its TEM image with different corrugation spacing. Even annealing at 873 K, the sample still has a big surface area of 172 $m^2$ $g^{-1}$, which was calculated by multipoint Brunauer-Emmet-Teller (BET) method (FIG. 6b). The possible reason is that the overlapped nanosheets can still retain their exposed surface owing to the unique wavelike surface structure, which can be directly observed in overlapped LTO nanosheets as shown in FIG. 4.

Solid-State NMR Analysis

Figure 7:
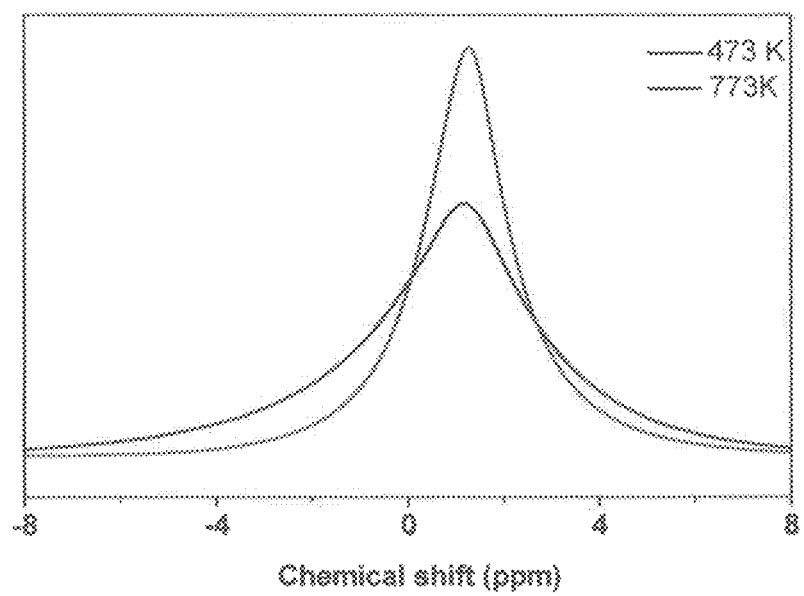
FIG. 7 is a graph showing a Magic angle spinning solid-state Li NMR spectra of LTO samples annealed at 473 and 773 K.
Figure 8:
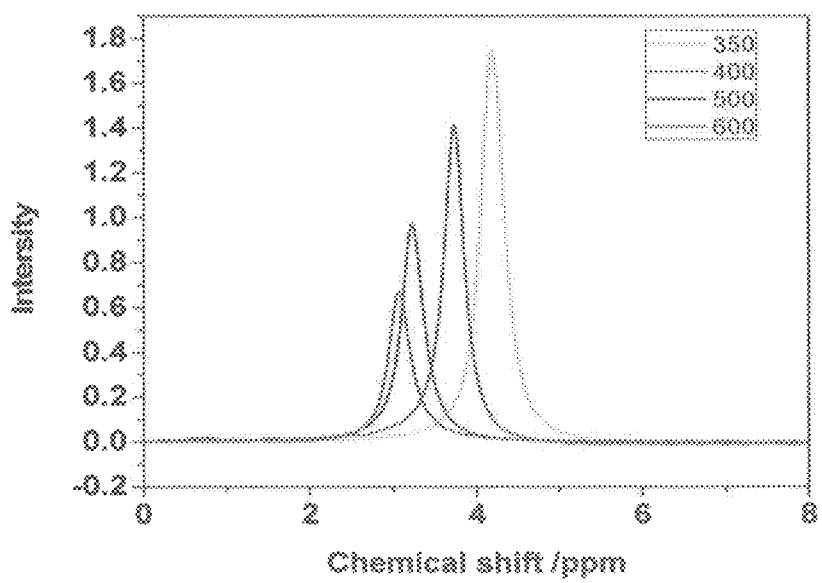
FIG. 8 is a graph showing Cross polarization/magic angle spinning solid-state H NMR spectra of LTO samples.
Figure 9:
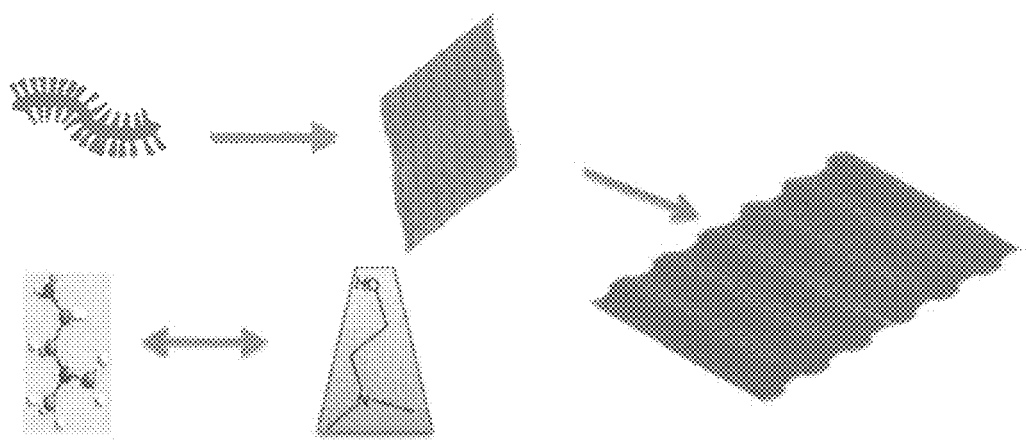
FIG. 9 is a schematic illustration of a formation mechanism of wavelike LTO nanosheets.

Microenvironments of LTO samples were further explored by solid-state NMR. $^7$Li magic angle spinning (MAS) spectra of LTO samples annealed at 473 and 773 K were recorded on a JNM-ECA400 spectrometer at 100.5 MHz and chemical shifts were referenced to a 1.0 M lithium chloride aqueous solution. As shown in FIG. 7, the resonance of LTO annealed at 473 K is actually composed of two resonances, a broad resonance due to Li on 16 d and a narrow resonance due to Li on 8 a.[22] With increasing the temperature, Li on 16 d jumped on 8 a and the broad resonance (Li on 16 d) disappears. Meanwhile, the spinel $Li_4Ti_5O_{12}$ could be obtained from amorphous lithium titanate. The cubic local environment of the 8 a is consistent with the XRD analysis of cubic spinel LTO. The reversible capacity of electrode material is limited by the amounts of protons attached to the surface or the bulk, which is irreversibly replaced by lithium ion when discharging the battery.[23] In fact, different amount of protons were present in the LTO nanosheet samples as proved by CP/MAS $^1$H NMR spectra of LTO samples (FIG. 8). With increasing the temperature, the amount of proton residue decreased. It gives a possible way to improve the reversible capacity of LTO samples which were synthesized in a watery environment.

Formation of Wavelike or Wavy LTO Nanosheets

The actual formation mechanism of the wavelike LTO nanosheets is not yet clarified. A possible one is proposed and schematically illustrated in FIG. 9. First, amorphous lithium titanate can be fast formed because of the co-hydrolysis of lithium and Titanium resources. And what is more, low-cost dimethylethanolamine (DMEA) acts as an effective difunctional structure directing agent with the ammonium group (big head) and hydroxyl group (small tail). The two kinds of functional groups could easily form strong intermolecular hydrogen bonds with Ti—OH groups, which may form a curve by well-organized organic molecular structure and lead to the formation of wavelike structure. Then wavelike amorphous titanate nanosheets were formed along 2D plane direction due to growth along 2D plane direction to form large-scale wavelike nanosheet. The role of DMEA makes it possible to fabricate the wavelike framework with retained high surface area upon overlapping.

Figure 10:
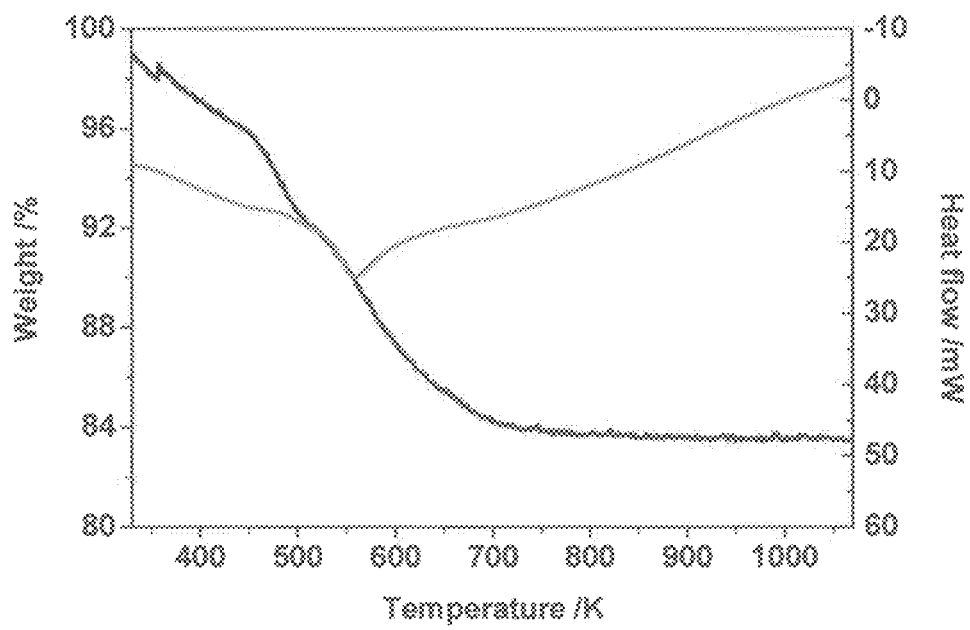
FIG. 10 is a graph showing TGA curves of as-synthesized sample at a temperature-rise rate of 10 K min$^{-1}$.
Figure 12A:
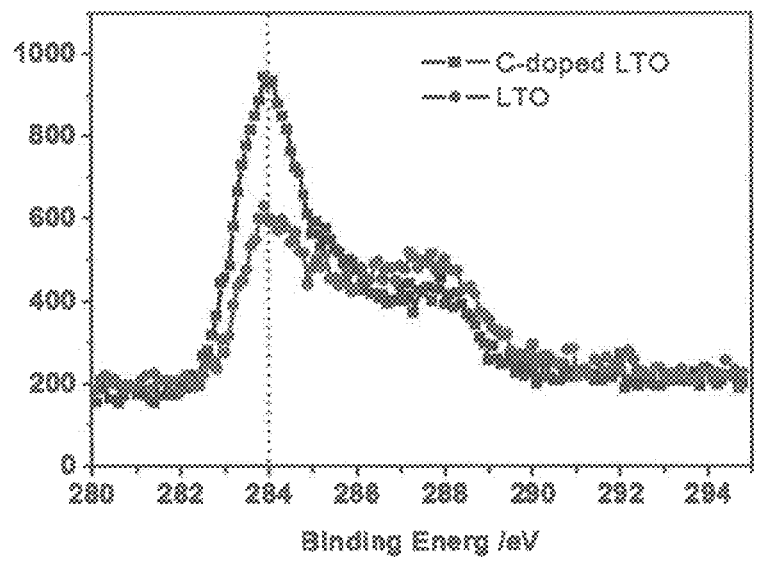
FIG. 12a is a graph showing Carbon 1 s XPS spectra of a carbon coated LTO sample calibrated by adventitious carbon at 384 eV.
Figure 12B:
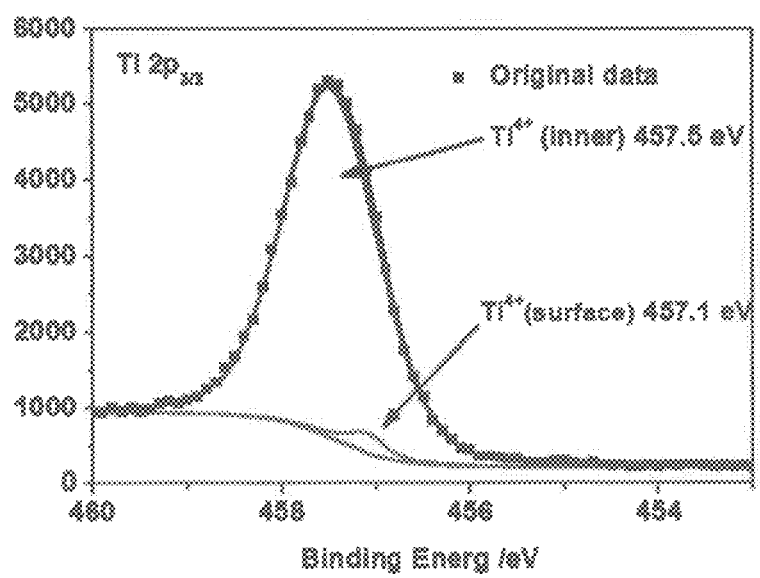
FIG. 12b is a graph showing Titanium 2 p XPS spectra of a carbon coated LTO sample calibrated by adventitious carbon at 384 eV.
Figure 13A:
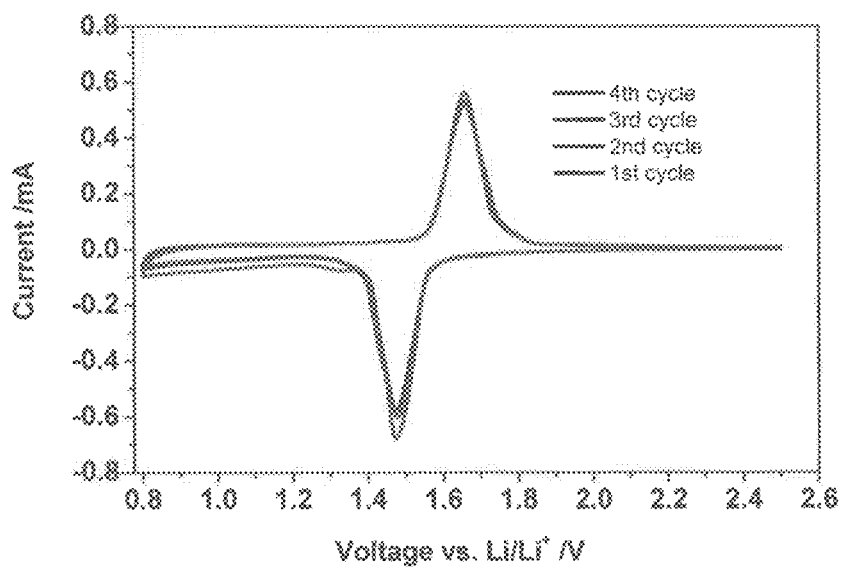
FIG. 13a is a graph showing cyclic voltammogram of CLTO at a scan rate of 0.2 mV s$^{-1}$.
Figure 13B:
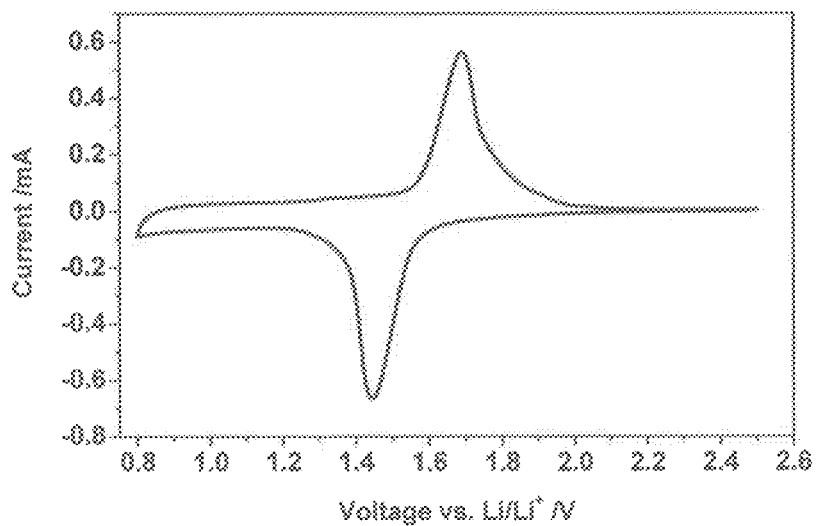
FIG. 13b is a graph showing cyclic voltammogram of LTO nanosheets at a scan rate of 0.2 mV s$^{-1}$.

After removal of solvent, a single-molecule layer of DMEA is still firmly held on the surface of amorphous titanate nanosheets below 523 K and is decomposed at 573 K or above, which is supported by thermogravimetry (FIG. 10). Therefore, after crystallized in air, white powder is obtained due to the removal of the organic layer. However, the obtained sample is a gray powder after annealed in the absence of air. We hypothesized that 'carbon joint' was formed owing to the carbonization of single-molecule DMEA layer. The 0.6 wt. % of exact carbon content is detected by trace elemental analysis. However, the 'carbon joint' of 0.6 wt. %, which stemmed from the carbonization of single-molecule DMEA layer, is so low and thin that it is hardly detected by HRTEM image.

Detection of Carbon

To detect the position of carbon, elemental maps of Ti, C and O in CLTO were collected using high-angle annular dark-field scanning transmission electron microscopy (HAADF-STEM) and energy-dispersive X-ray spectroscopy (EDS) technologies. FIG. 11a is STEM image of single LTO nanosheet and its shape is consistent with the elemental maps of Ti and O in FIG. 11b and FIG. 11d. In FIG. 11c, the carbon distribution on the directly exposed 2D LTO surface (oval 2) is close to that on blank part (oval 3), that is, no carbon exists on the directly exposed LTO interface. Luckily, the carbon content at the joint part (oval 1) is higher than that in oval 2 and 3, which confirms our speculation that the carbon exists in the joint of particles. To facilitate the understanding, we provided the schematic formation of 'carbon joint' between the overlapped wavelike LTO nanosheets in the absence of air as shown in FIG. 1.

To further confirm the microenvironment of C and Ti, the surface chemical compositions of LTO samples were determined by X-ray photo-electron spectrometer (XPS). The carbon content of CLTO has a significant increase than adventitious carbon at 384 eV (FIG. 12a) as an auxiliary evidence for carbon analysis. The exact contents of carbon cannot be obtained, because the intensity depends not only on the amount of carbon in the sample but also on the amount of loading sample. Moreover, in FIG. 12b, two kinds of $Ti^{4+}$ peaks on CLTO at 457.1 eV and 457.5 eV are due to the different microenvironment between big exposed surface and inner crystal, which may improve the surface performance for lithium storage. No $Ti^{3+}$ was detected in CLTO sample.[16]

Electrochemical Studies

The electrochemical studies of the CLTO and LTO annealed at 873 K were obtained using two-electrode Swagelok-type cells with Li metal slices serving as both the counter and reference electrodes at room temperature. The working electrode was composed of 70 wt % of the active material, 20 wt % of conductivity agent (carbon black, Super-P-Li), and 10 wt % of binder (polyvinylidene difluoride, PVDF, Aldrich). The electrolyte used was 1 M $LiPF_6$ in a 1:1 (w/w) mixture of ethylene carbonate and diethyl carbonate. Cell assembly was carried out in an Argon-filled glove box. Cyclic voltammetry (CV, 0.8-2.5 V, 0.2 mV $s^{-1}$) was performed using an electrochemical workstation (CHI 760D). Galvanostatic charge/discharge cycling was conducted using a battery tester (NEWAER) at different current rates of 10 C-100 C, where 1 C=170 mA $g^{-1}$. The cyclic voltammetric curve (FIG. 13a) of electrode made of CLTO was determined at a scanning rate of 0.2 mV $s^{-1}$. The typical current peaks of LTO are obvious at voltages of ~1.47 V and ~1.66 V. Its insertion-deinsertion peak separation of 0.19 V is smaller than 0.24 V of LTO (FIG. 13b) at the same scan rate, which reflects that CLTO has low polarization.

Figure 14A:
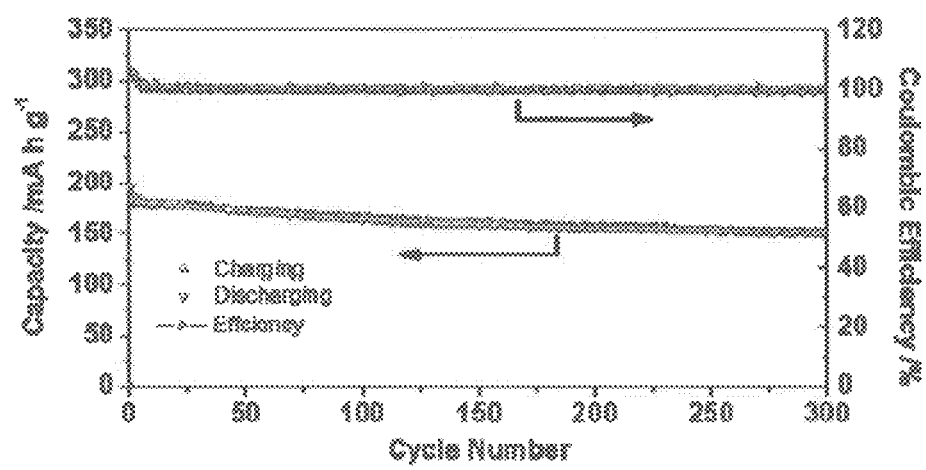
FIG. 14a is a graph showing cycling performance of CLTO cycled at a constant current drain of 10 C and the corresponding Coulombic efficiency.
Figure 14B:
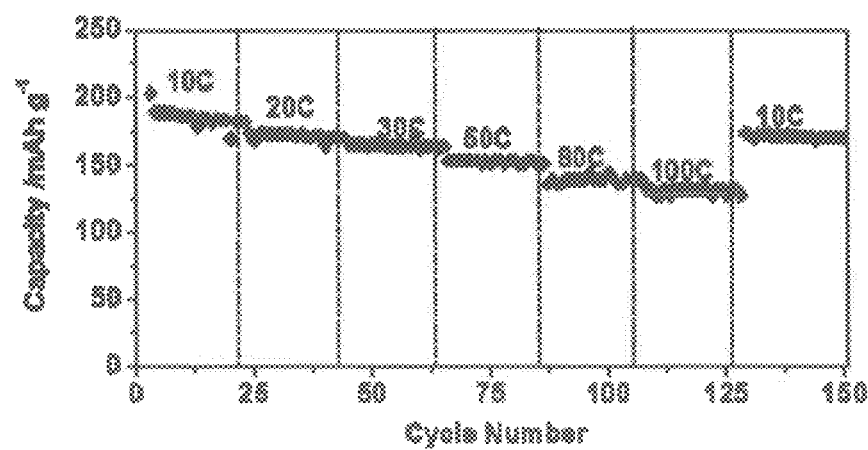
FIG. 14b is a graph showing cycling performance of CLTO at different charge/discharge rates (10 C-100 C)
Figure 14C:
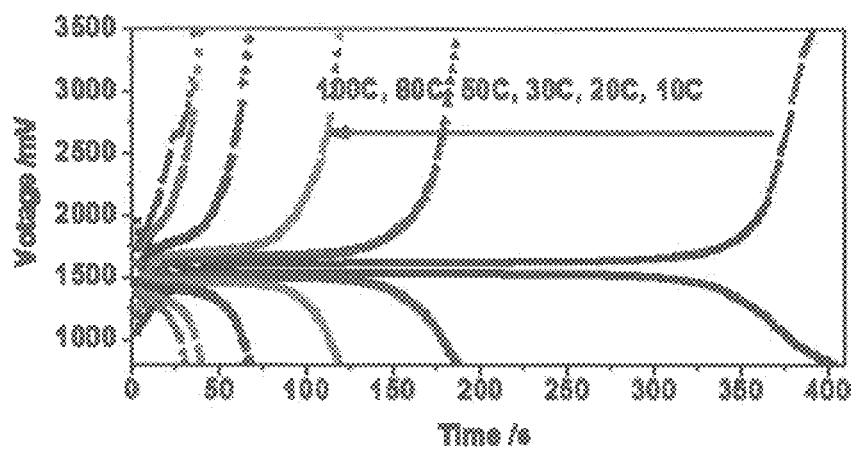
FIG. 14c is a graph showing discharging/charging time needed at different charge/discharge rates (10 C-100 C)
Figure 15:
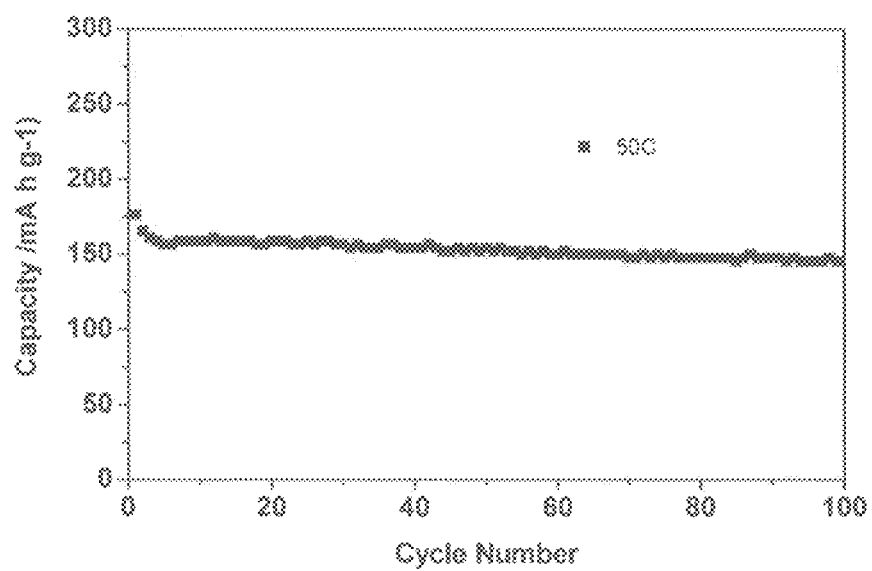
FIG. 15 is a graph showing cycling performance of CLTO nanosheets at charge/discharge rate of 50 C.

The cycling performance and needed time of CLTO was studied as a high-rate anode material. FIG. 14a shows the cycling performance of the CLTO at a current drain of 10 C. After 300 charge/discharge cycles, a reversible discharge capacity as high as 151 mAh g$^{-1}$ can still be retained and its Coulombic efficiency almost approaches 100%. The improvement of capacity at high rate is due to large electrolyte/electrode interface (grain boundaries) that leads to pseudocapacitive insertion/extraction.[25] The rate performance of the CLTO at 10 C-100 C was further investigated as shown in FIG. 14b and clearly demonstrates excellent cycling performance at all current rates. At 20 C and 30 C, the discharge capacities are around 171 mAh g$^{-1}$ and 164 mAh g$^{-1}$ respectively, which is very close to its LTO theoretical capacity.[26] It can still retain 151 mAh g$^{-1}$ at 50 C. Even at the highest rate of 100 C (17 A g$^{-1}$), a capacity of 122 mAh g$^{-1}$ can be held. Evidently, the electrochemical performance of CLTO is one of best results in all reported LTO and TiO$_2$ nanomaterials. Charge/discharge experiment at 50 C was conducted to investigate its high-rate capacities and cycling performance (FIG. 15). After 100 full charge/discharge cycles, their discharge capacity of 148 mAh g$^{-1}$ can be remained and its Coulombic efficiency also approaches 100%. The electrochemical studies demonstrated that the wavelike CLTO nanosheets exhibit an excellent reversible capacity, stable cycling performance, and superior high-rate capability. The discharging/charging time of CLTO nanosheets shows that this material is ideal anode for ultrafast charging lithium-ion batteries (FIG. 14c). Its full charging time at 10 C, 20 C, 30 C are shortened to ~6.5, 3, 2 minutes respectively. At higher rates, the charging time needed is only 1 minute (at 50 C) or less.

Figure 16:
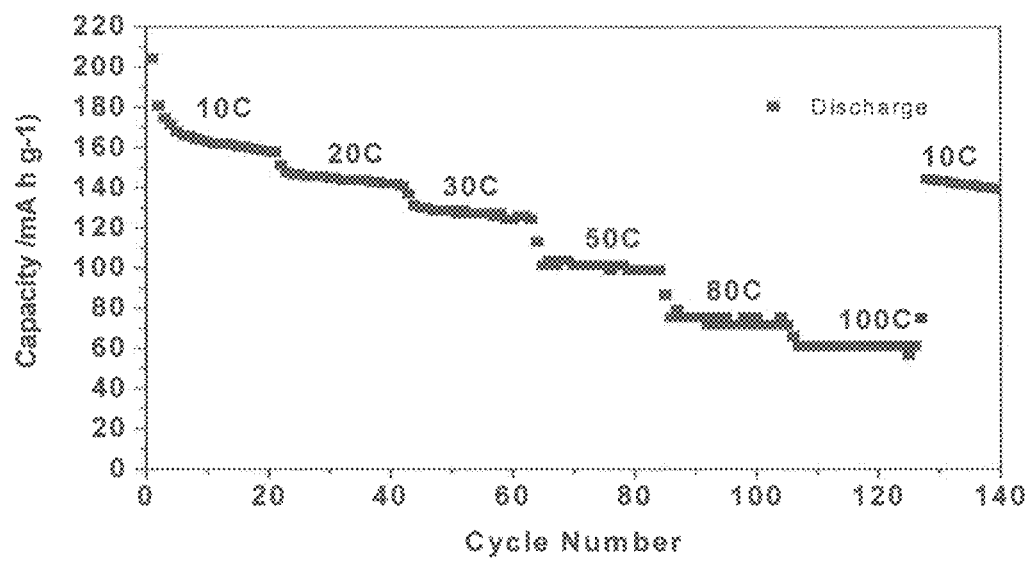
FIG. 16 is a graph showing cycling performance of LTO nanosheets at different charge/discharge rates (10 C-100 C)

As a comparison task, the electrochemical performance of LTO was also studied at high rates from 10 C to 100 C (FIG. 16). It exhibits a high capacity of 165, 147, 129, 101 and 75 mAh g$^{-1}$ at high discharge/charge rates of 10 C, 20 C, 30 C, 50 C, 80 C respectively, which is superior to the most recently reported LTO materials without any additive.[15c, 24, 27] Therefore, the unique surface properties of LTO are conducive to overcoming its insulating characteristic. Compared with LTO nanosheets, the improvement of high-rate performance of CLTO should owe to the 'carbon joint' formed at adjacent interface of LTO, by which the surface insulating characteristic of LTO may be significantly improved with the assistance of 'carbon-joint'. However, the carbon joint, which stemmed from the carbonization of single-molecule DMEA layer, is so thin that it is hardly detected by HRTEM.

On the basis of the above analysis, the wavelike CLTO nanosheets can provide a short path for lithium-ion migration and a big electrolyte/electrode interface for lithium insertion. We believe that wavelike LTO materials with 'carbon joint' have extensive application prospect for ultrafast charging lithium-ion batteries and hybrid super-capacitors. We believe that the 'co-hydrolysis' method is an alternative approach to develop new high-performance electrode materials.

Method of Synthesis

Compared with traditional molten-salt method,[16a] amorphous lithium titanate can be obtained at lower temperature due to the uniform distribution of lithium and titanium formed by rapid hydrolysis according to equations (1) and (2) below, which avoid high-temperature melt salts and long-time milling for mixing and reducing grain size.

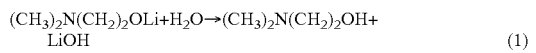

(1)

(2)

Furthermore, solvents can be easily removed and reused for a next cycle. After annealing in air and in absence of air, LTO and carbon coated LTO (CLTO) can be facilely obtained in a large scale respectively.

Figure 17:
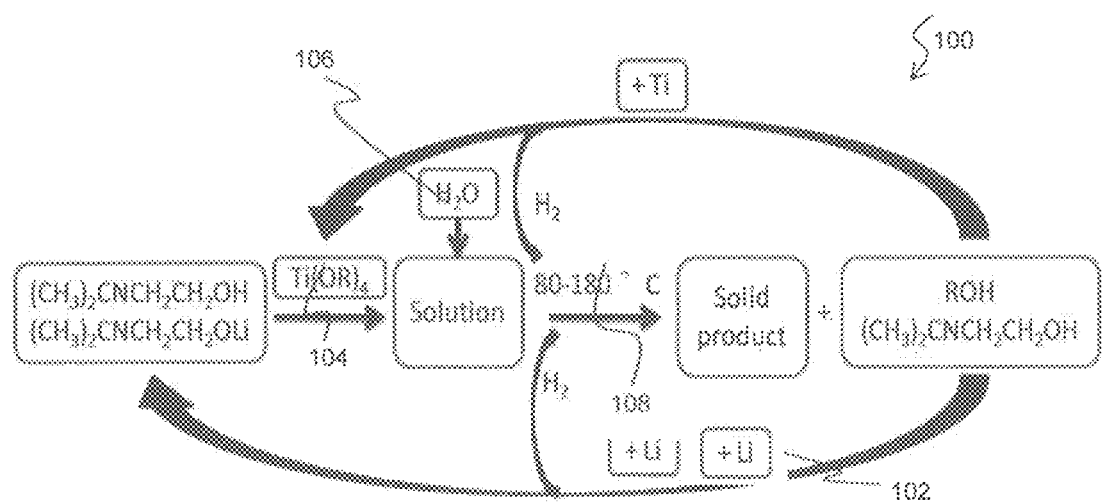
FIG. 17 is a schematic diagram of a synthesis route of $Li_4Ti_5O_{12}$ nanosheets.

As shown in FIG. 17, the method 100 comprises placing lithium (Li) in an organic solvent such as an organic alcohol (ROH) to form a first solution of ROLi in excess ROH, 102. The organic alcohol ROH also functions as a surfactant without requiring the provision of another template. Titanium (Ti) is added to the first solution of ROLi in ROH solution, via an organic titanium source such as Ti(OR)$_4$, to form a second solution, 104. Water is added to the second solution to form a diluted second solution, 106, followed by heating the diluted second solution at a temperature ranging between 80-180° C., 108. After the heating, a solid intermediate product of wavy Li$_4$Ti$_5$O$_{12}$ nanosheets is obtained together with unused solvent ROH. The unused solvent ROH may be reused in a subsequent cycle of synthesis. Wavy Li$_4$Ti$_5$O$_{12}$ nanosheets are obtained after annealing the solid intermediate product in air. To obtain the C—Li$_4$Ti$_5$O$_{12}$, the solid intermediate product is then annealed in the absence of air.

In a first exemplary embodiment of the method 100 of synthesis described above, metal Li is put into dimethylethanolamine (DMEA) immersed in an ice-bath to form a solution A (0.5 mol of Li in 200 g DMEA). Tetrabutyl titanate (0.625 mol, ~213 g) is then added into solution A to form solution B. The solution B is placed in a Teflon-lined stainless steel reactor and H$_2$O is added to form a diluted solution B (4-5 ml of H$_2$O needed per 15 ml of solution B), followed by heating of the diluted solution B at 433 K for 10 to 24 hours. Solid product from the reaction in the steel reactor can be directly annealed at temperatures ranging from 623K to 873K for 1 to 2 hours respectively, and remaining liquid including DMEA and n-butanol can be reused for a next cycle of synthesis.

In a second exemplary embodiment of the method 100 of synthesis described above, 16 metal Li is put into dimethylethanolamine (DMEA) immersed in an ice-bath to form a solution A (0.5 mol of Li in 200 g DMEA). Tetrabutyl titanate of 0.625 mol (~213 g) was then added into solution A to form a solution B. The solution B is placed in a Teflon-lined stainless steel reactor and H$_2$O is added to form a diluted solution B (4-5 ml of H$_2$O needed per 15 ml solution B), followed by heating of the diluted solution B at temperatures ranging from 80-180° C. for 24 hours. After reaction, white amorphous lithium titanate is obtained due to the uniform distribution of lithium and titanium formed by rapid hydrolysis (as given by equations (1) and (2) above), which avoid high-temperature melt salts and long-time milling for reducing grain size.

The white solid products (LTOs) can be obtained by directly annealing at 350-700° C. for 2 hours and the obtained samples are gray powder (CLTOs) when annealing in the absence of air. Remaining liquid including DMEA and n-butanol can be reused for a next cycle of synthesis.

Sample Characterizations

XRD patterns were performed with a D8 diffractometer with Cu—Kα radiation (λ=1.54056 Å). TEM were obtained with JEOL JEM-1400 and JEOL 2100F. Elemental maps were collected using a JEM 2100F with a HAADF-STEM detector and an Oxford EDS. N$_2$ adsorption-desorption isotherms were conducted at 77 K on a Micromeritics Tristar 3000 analyzer. The BET surface areas and pore-size distribution curves were concluded using adsorption data. $^7$Li, and 1H Cross Polarization/Magic-Angle Spinning (CP/MAS) or MAS NMR measurements, a JNM-ECA400 spectrometer was used at 100.5 and 400.0 MHz, respectively. X-ray photoelectron spectroscopic (XPS, KRATOS, AXIS ULTRA DLD) measurements were carried out by using a monochromated Al Kα (1486.7 eV) X-ray source at power of 150 W (15 kV×10 mA). The XPS analysis was carried out at room temperature under a typical pressure in the range of $1.0\ e^{-9}$ Torr—$5.0\ e^{-9}$ Torr, at take-off angle relative to the surface holder of about 90°. Thermogravimetric analysis was determined using a thermal gravity analyzer (TGA) at a temperature-rise rate of 10 K min$^{-1}$ from room temperature to 1073 K under a continuous air flow. Carbon trance analysis is determined using EuroVector Euro EA elemental analyzer Compared with other reported methods for titanium based anode materials, the low-cost material of the present invention exhibits the best performance as shown in Table 1 below.

TABLE 1

| Materials | Capacities at different charging rates (1 C = 170 mA g$^{-1}$)/mA h g$^{-1}$ | | | | Reference |
| --- | --- | --- | --- | --- | --- |
| | 10 C | 20 C | 30 C | 50 C | |
| CLTO | 180 | 170 | 160 | 150 | This work |
| Titanate nanosheets | 155 | 145 | 125 | 100 | Adv. Mater. 2011, 23, 998 |
| TiO$_2$ nanosheets | 120 | 98 | | | J. Am. Soc. Chem. 2010, 132, 6124 |
| LTO | 160 | 120 | | | Electrochem. Commun., 2011, 13, 650 |
| Mesoporous TiO$_2$ | 125 | | 91 | | Adv. Mater. 2007, 19, 2087 |
| Li$_4$Ti$_5$O$_{12}$/C | 130 | 125 | | | Energy Environ. Sci., 2011, DOI:10.1039/C1EE01680F |
| Li$_4$Ti$_5$O$_{12}$/C | 110 | | | | Energy Environ. Sci., 2011, 4, 1345 |

As described above, wavelike LTO nanosheet can be formed having a big exposed surface area of 205 m$^2$ g$^{-1}$ for lithium insertion. The 'carbon joint' of 0.6 wt. % can be synthesized in situ without other additives. The CLTO product can be prepared on a large scale and it can endure high-rate charge from 10 C to 100 C (1.7-17 A g$^{-1}$), while the needed charging time can be shortened to 1 minute or less.

Whilst there has been described in the foregoing description exemplary embodiments of the present invention, it will be understood by those skilled in the technology concerned that many variations in details of design, construction and/or operation may be made without departing from the present invention. For example, the method can also be used to synthesize many other materials, such as cobalt, zirconium doped C—Li$_4$Ti$_5$O$_{12}$, silica and zirconia based materials.

REFERENCES (1) Chan, C. K.; Peng, H. L.; Liu, G.; McIlwrath, K.; Zhang, X. F.; Huggins, R. A.; Cui, Y. *Nat. Nanotechnol.* 2008, 3, 31.
(2) Paek, S. M.; Yoo, E.; Honma, I. *Nano Lett.* 2009, 9, 72.
(3) Zhang, W. M.; Hu, J. S.; Guo, Y. G.; Zheng, S. F.; Zhong, L. S.; Song, W. G.; Wan, L. J. *Adv. Mater.* 2008, 20, 1160.
(4) Lou, X. W.; Deng, D.; Lee, J. Y.; Feng, J.; Archer, L. A. *Adv. Mater.* 2008, 20, 258.
(5) Magasinski, A.; Dixon, P.; Hertzberg, B.; Kvit, A.; Ayala, J.; Yushin, G. *Nat. Mater.* 2010, 9, 353.
(6) Kang, B.; Ceder, G. *Nature* 2009, 458, 190.
(7) Kang, K. S.; Meng, Y. S.; Breger, J.; Grey, C. P.; Ceder, G. *Science* 2006, 311, 977.
(8) Nam, K. T.; Kim, D W.; Yoo, P. J.; Chiang, C. Y.; Meethong, N.; Hammond, P. T.; Chiang, Y. M.; Belcher, A. M. *Science* 2006, 312, 885.
(9) Ohzuku, T.; Ueda, A.; Yamamoto, N. *J. Electrochem. Soc.* 1995, 142, 1431.
(10) Kavan, L.; Gratzel, M. *Electrochem. Solid State Lett.* 2002, 5, A39.
(11) Huang, S. H.; Wen, Z. Y.; Zhu, X. J.; Gu, Z. H. *Electrochem. Commun.* 2004, 6, 1093.
(12) Park, K. S.; Benayad, A.; Kang, D. J.; Doo, S. G. *J. Am. Chem. Soc.* 2008, 130, 14930.
(13) Li, X.; Qu, M. Z.; Huai, Y. J.; Yu, Z. L. *Electrochim. Acta* 2010, 55, 2978.
(14) Yi, T.-F.; Jiang, L.-J.; Shu, J.; Yue, C.-B.; Zhu, R.-S.; Qiao, H.-B. *J. Phys. Chem. Solids* 2010, 71, 1236.
(15) a) S. H. Huang, Z. Y. Wen, X. J. Zhu, Z. H. Gu, *Electrochem. Commun.* 2004, 6, 1093-1097; b) K. S. Park, A. Benayad, D. J. Kang, S. G. Doo, *J. Am. Chem. Soc.* 2008, 130, 14930-14931; c) X. Li, M. Z. Qu, Y. J. Huai, Z. L. Yu, *Electrochim. Acta* 2010, 55, 2978-2982; d) T.-F. Yi, L.-J. Jiang, J. Shu, C.-B. Yue, R.-S. Zhu, H.-B. Qiao, *J. Phys. Chem. Solids* 2010, 71, 1236-1242
(16) a) L. Cheng, H. J. Liu, J. J. Zhang, H. M. Xiong, Y. Y. Xia, *J. Electrochem. Soc.* 2006, 153, A1472-A1477; b) M. M. Rahman, J. Z. Wang, M. F. Hassan, S. L. Chou, D. Wexler, H. K. Liu, *J. Power Sources* 2010, 195, 4297-4303.
(17) a) S. H. Yu, A. Pucci, T. Herntrich, M. G. Willinger, S. H. Baek, Y. E. Sung, N. Pinna, *J. Mater. Chem.* 2011, 21, 806-810; b) J. Lim, E. Choi, V. Mathew, D. Kim, D. Ahn, J. Gim, S. H. Kang, J. Kim, *J. Electrochem. Soc.* 2011, 158, A275-A280; c) L. Kavan, J. Prochazka, T. M. Spitler, M. Kalbac, M. T. Zukalova, T. Drezen, M. Gratzel, *J. Electrochem. Soc.* 2003, 150, A1000-A1007.
(18) J. R. Li, Z. L. Tang, Z. T. Zhang, *Electrochem. Commun.* 2005, 7, 894-899.
(19) C. Lai, Y. Y. Dou, X. Li, X. P. Gao, *J. Power Sources* 2010, 195, 3676-3679.
(20) J. J. Huang, Z. Y. Jiang, *Electrochim. Acta* 2008, 53, 7756-7759.
(21) a) Y. F. Tang, L. Yang, S. H. Fang, Z. Qiu, *Electrochim. Acta* 2009, 54, 6244-6249; b) J. Liu, J. S. Chen, X. Wei, X. W. Lou, X.-W. Liu, *Adv. Mater.* 2011, 23, 998-1002.
(22) a) C. P. Grey, N. Dupre, *Chem. Rev.* 2004, 104, 4493-4512; b) M. Wagemaker, R. van de Krol, A. P. M. Kentgens, A. A. van Well, F. M. Mulder, *J. Am. Chem. Soc.* 2001, 123, 11454-11461.
(23) W. J. H. Borghols, D. Lutzenkirchen-Hecht, U. Haake, W. Chan, U. Lafont, E. M. Kelder, E. R. H. van Eck, A. P. M. Kentgens, F. M. Mulder, M. Wagemaker, *J. Electrochem. Soc.* 2010, 157, A582-A588.
(24) H.-G. Jung, S.-T. Myung, C. S. Yoon, S.-B. Son, K. H. Oh, K. Amine, B. Scrosati, Y.-K. Sun, *Energy Environ. Sci.* 2011, 4, 1345-1351.

(25) H. Zhang, G. R. Li, L. P. An, T. Y. Yan, X. P. Gao, H. Y. Zhu, *J. Phys. Chem. C* 2007, 111, 6143-6148.
(26) S. Scharner, W. Weppner, P. Schmid-Beurmann, *J. Electrochem. Soc.* 1999, 146, 857-861.
(27) a) K. Amine, I. Belharouak, Z. H. Chen, T. Tran, H. Yumoto, N. Ota, S. T. Myung, Y. K. Sun, *Adv. Mater.* 2010, 22, 3052-3057; b) Y. F. Tang, L. Yang, S. H. Fang, Z. Qiu, *Electrochim. Acta* 2009, 54, 6244-6249; c) L. Zhao, Y.-S. Hu, H. Li, Z. Wang, L. Chen, *Adv. Mater.* 2011, 23, 1385-1388; d) G.-N. Zhu, H.-J. Liu, J.-H. Zhuang, C.-X. Wang, Y.-G. Wang, Y.-Y. Xia, *Energy Environ. Sci.* 2011, 4, 4016-4022.

The invention claimed is:

1. An anode material for ultrafast-charging lithium ion batteries, the anode material comprising C—$Li_4Ti_5O_{12}$ having a nanosheet structure.

2. The anode material of claim 1, wherein the anode material comprises 0.6 wt. % carbon.

3. The anode material of claim 1, having a lithium storage capacity of 180-122 mA h $g^{-1}$.

4. The anode material of claim 1, having a discharge/charge rate ranging from 1.7 to 17 A $g^{-1}$.

5. The anode material of claim 1, having a full discharging/charging time of less than or equal to one minute at a discharging/charging rate of 50C.

6. The anode material of claim 1, wherein the C—$Li_4Ti_5O_{12}$ comprises two-dimensional wavy $Li_4Ti_5O_{12}$ nanosheets having carbon joints at adjacent $Li_4Ti_5O_{12}$ interfaces between adjacent two-dimensional wavy $Li_4Ti_5O_{12}$ nanosheets.

7. The anode material of claim 6, wherein the carbon joints at adjacent $Li_4Ti_5O_{12}$ interfaces are alternated with open channels formed between adjacent two-dimensional wavy $Li_4Ti_5O_{12}$ nanosheets.

8. A method of synthesizing an anode material for ultrafast-charging lithium ion batteries, the method comprising the steps of:
adding lithium to an organic alcohol to form a first solution;
adding titanium via an organic titanium source to the first solution to form a second solution;
adding water to the second solution to form a diluted second solution;
heating the diluted second solution at a temperature ranging from about 80° C. to about 180° C. to obtain solid $Li_4Ti_5O_{12}$; and
annealing the solid $Li_4Ti_5O_{12}$ in the absence of air to obtain the anode material comprising C—$Li_4Ti_5O_{12}$ having a nanosheet structure.

9. The method of claim 8, wherein the annealing forms carbon joints at adjacent $Li_4Ti_5O_{12}$ interfaces between adjacent two-dimensional wavy $Li_4Ti_5O_{12}$ nanosheets.

10. The method of claim 9, wherein the carbon joints are alternated with open channels formed between adjacent two-dimensional wavy $Li_4Ti_5O_{12}$ nanosheets.

11. The method of claim 8, wherein the organic alcohol is dimethylethanolamine (DMEA).

12. The method of claim 11, wherein the annealing comprises carbonizing a single-molecule layer of the DMEA.

* * * * *